United States Patent [19]
Maul et al.

[11] 3,891,600

[45] June 24, 1975

[54] HALOGEN CONTAINING FIRE RETARDANT ADDITIVE WITH IMPROVED HEAT STABILITY

[75] Inventors: James J. Maul; Richard D. Carlson, both of Grand Island, N.Y.

[73] Assignee: Hooker Chemicals & Plastics Corporation, Niagara Falls, N.Y.

[22] Filed: Jan. 2, 1974

[21] Appl. No.: 429,608

Related U.S. Application Data

[62] Division of Ser. No. 388,703, Aug. 15, 1973.

[52] U.S. Cl... 260/45.75 R; 260/45.7 R; 260/648 C
[51] Int. Cl. ............................................. C08f 45/58
[58] Field of Search ....... 260/45.7 R, 648 C, 648 R, 260/45.75 R

[56] References Cited
UNITED STATES PATENTS

| | | | |
|---|---|---|---|
| 2,028,715 | 1/1936 | Hanson | 252/8.1 |
| 2,952,710 | 9/1960 | Fields | 260/648 |
| 3,058,926 | 10/1962 | Eichhorn | 260/2.5 |
| 3,403,036 | 9/1968 | Hindersinn et al. | 260/45.75 |
| 3,432,461 | 3/1969 | Hill et al. | 260/45.75 |
| 3,787,356 | 1/1974 | Gourse | 260/45.75 |

FOREIGN PATENTS OR APPLICATIONS

794,661 5/1958 United Kingdom

OTHER PUBLICATIONS

Minsinger et al., Chem. Abs., Vol. 58, 1963, 12482h to 12483a.

*Primary Examiner*—M. J. Welsh
*Attorney, Agent, or Firm*—Peter F. Casella; James F. Mudd

[57] ABSTRACT

Halogenated derivatives of the Diels-Alder adduct of cyclohexene and halocyclopentadienes are excellent fire retardant additives for moldable polymers which additives are characterized by exceptional heat stability.

14 Claims, No Drawings

HALOGEN CONTAINING FIRE RETARDANT ADDITIVE WITH IMPROVED HEAT STABILITY

This is a division of application Ser. No. 388,703 filed Aug. 15, 1973.

This invention relates to new compositions of matter possessing unexpectedly good heat stability. More particularly, it relates to polyhalogenated cyclohexene-halocyclopentadiene adducts, and mixtures thereof which are not only efficient fire retardant additives for polymers but also unexpectedly resistant to decomposition at polymer molding temperatures.

BACKGROUND OF THE INVENTION

It is known to prepare molded articles from polymerized monomers by heating the same to temperatures of about 400° Fahrenheit under pressure in molding presses. It is known further to impart varying degrees of fire retardance to the molded articles by incorporating in the moldable mass various organic and inorganic substances. Many organic additives suggested for this purpose contain labile halogen, which under the molding conditions, tend to decompose causing discoloration and other physical degradation. For example, chlorinated paraffins, such as "chlorowaxes" are relatively effective as fire retardant additives and, being relatively inexpensive, are widely used. However, such substances decompose under molding temperatures resulting in discoloration of the molded articles and hence their use in many molding applications is limited.

It is an object of this invention to provide fire retardant additives which do not decompose at polymer molding temperatures, i.e., at about 400° Fahrenheit.

Another object is to provide new heat stable fire retardant polymer compositions which do not discolor under molding conditions.

Other objects of this invention will be obvious from the following description.

BRIEF DESCRIPTION OF THE INVENTION

The compounds prepared by the process of this invention possess the structure

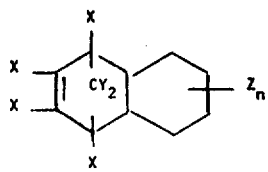

wherein X is a halogen independently selected from the group consisting of fluorine, bromine, and chlorine, Y is independently selected from the group consisting of fluorine, chlorine, bromine, alkyl of 1 to 10 carbon atoms, alkyloxy wherein the alkyl group contains from 1 to 10 carbon atoms, haloalkyl and haloalkyloxy wherein the said alkyl groups contain from 1 to 10 carbons and said halo- is fluoro, chloro or bromo, Z is a halogen selected from the group consisting of chlorine and bromine, and n is an integer from 1 to 8.

These compounds are prepared by reacting a mixture of cyclohexene with a halocyclopentadiene of the structure

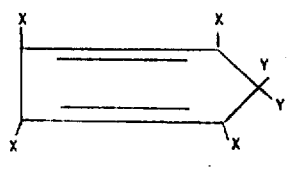

wherein X and Y are as defined above, thereafter reacting the resulting adduct with a free radical halogenating agent such as sulfuryl chloride, sulfuryl bromide, chlorine, bromine mixtures thereof and the like, as defined hereinafter in the presence of a halogenation catalyst and recovering a mixture of halogenated cyclohexene halocyclopentadiene adducts containing from 1 to 8 atoms of halogen in the cyclohexane moiety of the adducts.

This invention includes also the novel compounds prepared by the process of this invention and which have the following general formula

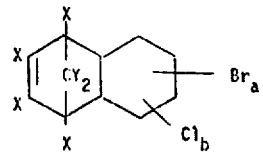

wherein X and Y are as defined above meaning, $a$ is one or two and $b$ is 0 or 1.

The products of this process are frequently oils to low melting solids and are mixtures of mono-, di-, tri- and tetra-, and higher halogenated (in the cyclohexane moiety) derivatives. Such products are effective fire retardant additives to polymer compositions and are characterized by excellent stability at the temperatures of the usual polymer molding processes.

DESCRIPTION OF PREFERRED EMBODIMENT

A preferred compound of this invention is the tetrachlorinated derivative of the cyclohexene-hexachlorocyclopentadiene adduct, having the structure

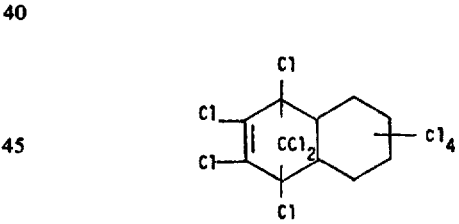

This compound 1,2,3,4,5,6,7,8,9,9-decachloro-1,2,3,4,4a,5,8,8a-octahydro-5,8-methanonaphthalene, has been prepared in 6 percent yield by heating 3,4,5,6-tetrachloro-1-cyclohexene with hexachlorocyclopentadiene in a sealed tube at 200° centigrade for 200 hours. (Monatshift fur Chemie Vol. 91, page 22–40 (1960). In accordance with the present invention, this compound is obtained together with its structural isomers by reacting the known cyclohexene-hexachlorocyclopentadiene adduct (J.A.C.S. Vol. 76, 2709(1954) with gaseous chlorine in the presence of light as catalyst. Substantially quantitative yields of this material are obtained.

In accordance with a preferred mode of carrying out the process of this invention, one mole proportion of cyclohexene dissolved in about one mole proportion of hexachlorocyclopentadiene is added dropwise to about two mole proportions of hexachlorocyclopentadiene at about 150° to 190° centigrade. The reaction mixture is maintained at about 150° to 190° centigrade for about 10 to 48 hours, and then the mass is distilled. After removal of the excess hexachlorocyclopentadiene, the product distills at about 140°-145° centigrade/0.5 mm. The distilled adduct on recrystallization from ethanol melts at 76° to 79° centigrade.

The cyclohexene-hexachlorocyclopentadiene adduct is dissolved in a suitable solvent, e.g., carbon tetrachloride, and chlorine gas is bubbled into the solution which is illuminated by a suitable source of light, e.g. ultra violet light. The addition of chlorine is continued until the effluent gas is practically free from hydrogen chloride, generally from about 5 to about 24 hours. The temperature during the chlorination increases from ambient to about 60° centigrade and then slowly decreases as the reaction nears completion. After flushing the reaction mass with an inert gas, e.g., nitrogen, the solvent is stripped from the mass leaving as a residue an oily product which is identified by elemental analysis as the polychlorinated cyclohexene-hexachlorocyclopentadiene adduct containing about 4 atoms of chlorine in the cyclohexene moiety of the adduct.

Halogenated cyclopentadienes suitable for use in this invention include hexahalocyclopentadienes, such as hexachlorocyclopentadiene, hexafluorocyclopentadiene and hexabromocyclopentadiene, monoalkyl-pentahalocyclopentadienes, such as 1-methyl-pentachlorocyclopentadiene, 1-ethyl pentabromocyclopentadiene, 1-hexyl pentafluorocyclopentadiene, 1-decyl pentachlorocyclopentadiene; dialkyltetrahalocyclopentadienes such as 1,1-dimethyl tetrachlorocyclopentadiene, 1,1-dibutyl-tetrachlorocyclopentadiene, 1-methyl, 1-hexyltetrabromocyclopentadiene, 1,1-dinonyl-tetrafluorocyclopentadiene, 1,1-didecyl tetrachlorocyclopentadiene; alkoxy pentahalocyclopentadienes such as 1-methoxylpentachloro- and 1,1-dimethoxy tetrachlorocyclopentadiene, 1-hexoxy pentabromo-, and 1-hexoxy, 1-octoxy tetrabromocyclopentadiene, 1-decoxy-pentachloro- and 1,1-didecoxy-tetrachlorocyclopentadiene, 1-ethoxypentafluoro- and 1-ethoxy, 1-butoxy-tetrafluorocyclopentadiene; monohaloalkyl halocyclopentadienes such as 1-chloromethylpentachlorocyclopentadiene, 1,1-bis(chloro-methyl) tetrachlorocyclopentadiene, 1-bromoethylpentabromocyclopentadiene, 1,1-bis(bromohexyl) tetrachlorocyclopentadiene, 1-fluorodecyl pentafluorocyclopentadiene, 1,1-bis(fluorodecyl) tetrafluorocyclopentadiene, 1-chloromethyl, 1-bromopropyl tetrabromocyclopentadiene.

The compounds of this invention can be prepared by an adduction step, wherein cyclohexene is reacted with the halocyclopentadiene reactant, followed by a halogenation step, wherein the adduct from step 1 is reacted with halogen in the presence of a catalyst.

The adduction step is preferably a liquid phase reaction. Although equimolar proportions of the reactants may be combined directly, the reaction is preferably carried out in the presence of a solvent.

The solvent may be an excess amount, over the stoichiometrical proportion, of either of the reactants or a solvent which is inert to the reactants and the reaction product may be used. Preferably the solvent should boil above about 100° centigrade. Suitable non-reactive solvents include toluene, xylene, nitrobenzene, methylcyclohexane, perchloroethylene, acetylene tetrachloride and the like.

The temperature employed in the adduction step may range from about 75° centigrade to about 200° centigrade, although temperatures outside this range can be used. Preferably the adduction reaction is effected at about 140 degrees to about 170° centigrade and even more preferably at about 150° to about 180° centigrade. The time required for the adduction to go essentially to completion may vary according to the reactivity of the halocyclopentadiene, the presence or absence of solvent, the temperature of the reaction, etc. Generally, a reaction period between about 5 and 50 hours will suffice, but preferably from about 10 to 48 hours and even more preferably from about 15 to 25 hours is required.

The reaction is preferably and conveniently carried out under atmospheric pressure conditions although superatmospheric pressures may be used, and on occasion may be preferred, especially where the halocyclopentadiene reactant is of low reactivity and/or high volatility. Generally when superatmospheric pressure is used, autogeneous pressure will suffice although pressures of from 1.1 atmospheres to 100 atmospheres or more can be used.

It is preferred to dissolve the cyclohexene in a solvent, preferably the halocyclopentadiene, and to add the solution, slowly, to a quantity of the halocyclopentadiene reactant, heated to the reaction temperature. Thereafter the reaction mass is maintained at the reaction temperature for a sufficient period to permit the adduction reaction to proceed essentially to completion. Alternatively the cyclohexene may be dissolved or suspended in the halocyclopentadiene, preferably in excess, and the mixture heated to the reaction temperature. When the cyclohexene reactant is present in excess amount, it is preferred to carry out the reaction in a closed system, i.e., under superatmospheric pressure. The halocyclopentadiene may be added to the cyclohexene as the temperature of the mixture is gradually increased to the desired reaction temperature.

Following completion of the adduction step, the solvent, if present, may be removed, e.g., by distillation and the adduct product purified e.g., by distillation, recrystallization or both. Alternatively the crude adduct can be halogenated directly, before or after removal of the solvent, if present.

The second or halogenation step of the process of this invention is preferably a liquid phase reaction, also. The temperature employed ranges from about ambient to about 200° centigrade. Preferably the reaction temperature is within the range of about 40° to about 150° centigrade and especially within the range of about 50° to about 80° centigrade. The time required may vary considerably and according to the degree of halogenation desired. Generally from about two to about twenty-four hours will be required although this period may vary, according to the temperature of the reaction, the rate at which the halogenating agent is fed into the reaction solution, the type and quantity of catalyst and the like variables. The course of the reaction may be observed by monitoring the effluent gases from the halogenation. When these gases are substantially free from hydrogen halide, or when the amount of hydrogen halide gas evolved approximates the desired degree of halogenation has been evolved the reaction may be considered to have been completed. The degree as well as the rate of halogenation may be increased by increasing the temperature of the reaction mass as the rate of evolution of the effluent hydrogen halide gas diminishes.

The solvent used in this step should be one that is inert to the reactants and the reaction product. Typical of the solvents which may be used include chlorinated aliphatics of from 1 to 6 carbon atoms, such as carbon tetrachloride, chloroform, methylene chloride, acetylene tetrachloride and the like.

Free radical halogenating agents which can be used in this process are known. Among the free radical chlorinating agents which can be used, the following are typical examples.

chlorine
t-butyl hypochlorite
sulfuryl chloride
chlorine monoxide
trichloromethanesulfonyl chloride
trichloromethanesulfenyl chloride
N-chlorosuccinimide
phosphorus pentachloride
iodobenzene dichloride
cupric chloride
N-chlorosulfonamide
N-chloro-dimethylamine-sulfuric acid-
acid-ferrous sulfate As exemplary of the free radical bromination agents which are useful in this process the following are mentioned.

bromine
N-bromosuccinimide
sulfuryl bromide
bromotrichloromethane
t-butylhypobromite
trichloromethanesulfonylbromide
bromine-chlorine mixtures By the term "free radical halogenation agent" is meant any halogenating agent capable of effecting halogen substitution under free radical conditions. A discussion of this type of halogenation reaction is contained in "Free Radical Chemistry" E. S. Hyser, editor, published by Marcel Dekker, N.Y. N.Y. 1969, particularly, for chlorination, see Vol. I, Chapter 3, by M. L. Poutsma, and, for bromination, see Vol. II, Chapter 2, by W. A. Thaler.

The preferred free radical halogenating agents are chlorine, bromine, sulfuryl chloride, sulfuryl bromide and mixtures thereof, because of their general effectiveness, availability and relative low cost.

Mixtures of bromine and chlorine can be used to brominate organic compounds to conserve the amount of the relatively expensive bromine. Halogenated products produced using mixtures of bromine and chlorine, while essentially brominated derivatives invariably also contain some proportions of the mixed halogenated derivatives, that is the products contain bromine and chlorine substituents.

The halogenation step is effected in the presence of a halogenation catalyst. Typical of the catalysts suitable for use in this step include sunlight; incandescent light; ultraviolet light; organic peroxides which decompose to free radicals under reaction conditions, such as benzoyl peroxides, lauryl peroxide, 2-ethyl-hexyl peroxydicarbonate, methyl ethyl ketone peroxide; azo compounds, such as azo bis isobutyronitrile, 2,2'azo bis(2,4-dimethyl valero) nitrile.

The halogenated cyclohexene-polyhalocyclopentadiene adducts obtained by the process of this invention are useful as fire retardant additives for polymers such as graft copolymers of polybutadiene, styrene and acrylonitrile, commonly called "ABS resins," high impact polystyrene, polypropylene, the nylons and the like. These new compounds can also be used to impart fire resistant properties to other high molecular weight polymers and resins such as those disclosed in U.S. Pat. No. 3,403,036, the disclosure of which is incorporated herein by reference.

The compounds obtained by the process of this invention are desirably incorporated in the polymeric materials in an effective fire retardant amount. Generally the compounds in the amount of from about 2 to about 50 percent by weight of the polymeric composition and desirably from about 5 to about 40 percent by weight, preferably from about 10 to about 35 percent by weight of the polymeric composition are mixed into said composition. Improved fire retardance and other desirable characteristics can be provided by incorporating such other adjuvants as metallic compounds such as antimony, bismuth and arsenic compounds, e.g., antimony oxide and arsenic sulfide, generally in the amount of from about 1 to about 30 percent by weight and preferably from about 2 to 25 percent by weight of said polymeric composition.

Other adjuvants such as plasticizers, mold release agents, lubricants, fillers, dyestuffs and pigments, may be included also.

The components comprising the compositions of this invention can be mixed by any of several well known methods. The additives can be introduced into the polymer while the latter is dissolved in a suitable solvent. This procedure is especially suitable when it is desired to incorporate the additives during the polymer manufacturing process. When the polymer is subsequently recovered from the solvent, the additives are intimately mixed with the polymer. The additives may be mixed with the polymer in the finely divided state and the mixture dry blended so that an intimate mixture is obtained on molding or extrusion. Alternatively, the additives may be mixed with the polymer in the molten state at temperatures which can range from the melting point to just below the decomposition temperature of the polymeric composition.

The following examples will illustrate the invention, but such examples are not intended to limit the scope of the invention. In the examples as well as in the above specification and claims appended hereto, parts and percentages are by weight and temperatures are given in degrees centigrade, unless otherwise specified. The properties of the molded polymer compositions were tested in accordance with the standard American Society for Testing Materials (ASTM), test procedure ASTM D 635-72.

In some of the Examples a modified ASTM D635-72 test was employed in that a cylindrical specimen about 150 mm long × 8 mm in diameter was substituted for the usual 127 mm length × 12.7 mm width bar.

The properties of the molded polymer compositions were also tested for Oxygen Index by the test procedure ASTM D 2863-70.

EXAMPLE 1

A. Preparation of Adduct

A solution of 82 parts (1 mole) of cyclohexene in 273 parts (1 mole) of hexachlorocyclopentadiene was added dropwise to 546 parts (2 moles) of hexachlorocyclopentadiene heated to and maintained at 176° to 180°. The resultant mixture was maintained at 176° to 180° for about 16 hours, after which the reaction mass was fractionally distilled. After removal of the unreacted hexachlorocyclopentadiene, the product, the adduct of cyclohexene and hexachlorocyclopentadiene having the structure

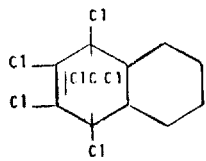

was collected as the fraction boiling at 142° to 145° under 0.5 mm pressure. 279.1 parts of this material were obtained. After being recrystallized from ethanol, the product melted at 76 to 79 degrees.

EXAMPLE 1B -

Chlorination of the Adduct

A portion, 433.1 parts (1.22 moles), of the adduct as prepared in Part A, above, was dissolved in about 840 parts of carbon tetrachloride. Into this solution, at ambient temperature, 558 parts (7.9 moles) of gaseous chlorine was introduced through a gas bubbling device while the solution was irradiated with a 250 watt Westinghouse H5KA mercury arc lamp. The temperature of the reaction rose to about 58° during the addition of chlorine. When the evolution of hydrogen chloride had substantially ceased, the mass was stripped of solvent at reduced pressure. The water-white residual oil 595.9 parts was a chlorinated derivative of cyclohexene-hexachlorocyclopentadiene containing an average of about 4 chlorine atoms on the cyclohexyl moiety. This was confirmed by elemental analysis.

EXAMPLE 1C -

Bromination of the Adduct

A portion, 85.7 parts (0.24 mole) of the adduct as prepared in Part A, above, was dissolved in about 320 parts of carbon tetrachloride. Into this solution, was added dropwise a solution of 193.1 parts (1.21 moles) of bromine dissolved in about 80 parts of carbon tetrachloride, while the reaction solution was irradiated with a 200 watt incandescent lamp during 13.5 hours. The solution was partially stripped to remove excess bromine. Additional carbon tetrachloride was added and the solution was washed with water, aqueous sodium thiosulfate, water, aqueous sodium bicarbonate and again with water. The solution was dried and the solvent evaporated to yield 119.9 parts of yellow viscous oil whose analysis was consistent with dibromination of the cyclohexane moiety.

EXAMPLE 1D -

Halogenation of the Adduct with Bromine-Chloride Mixture

A portion, 90.8 parts (0.26 moles) of the adduct as prepared in Part A, above, was dissolved in about 320 parts of carbon tetrachloride. Into this solution was added dropwise during 1.5 hrs. a solution of 130.2 parts (0.81 mole) of bromine, 36 parts (0.51 mole) of chlorine and about 160 parts of carbon tetrachloride, while the solution was irradiated with a 200 watt incandescent light. The light was then shone upon this solution for an additional 1.5 hours. The excess halogenation reagent was stripped off and then additional carbon tetrachloride was added. The solution was washed with water, aqueous sodium bicarbonate and again with water. The solution was dried and the solvent evaporated to yield 126 parts of light yellow viscous oil. The analysis of the product was consistent with two bromine and one chlorine atoms having been added to the cyclohexyl moiety.

EXAMPLE II

A mixture of 75 parts of ABS resin, 7 parts ASTM D2863-oxide, 17 parts of the polychloro-cyclohexene-hexachlorocyclopentadiene adduct, prepared as described in Example 1, Part B above, 1 part of zinc stearate and 0.5 part of modified dibutyltin-maleate (available commercially under the trade designation of Thermolite 24 stabilizer) were hot milled until homogeneous, sheeted, and ground in a Wiley mill. The ground blend was injection molded at about 400° Fahrenheit, using a one ounce plunger type injection molder to produce bar moldings of the dimensions 5 × 1/2 × 1/8 inches. The moldings were completely free from discoloration, an indication of the excellent heat stability of the polymer composition. The bars were ignited and were selfextinguishing in 3 seconds with an after glow of 6 seconds (ASTM-D635-72). The composition had an Oxygen Index ASTN D2863-70) of 29.

On the other hand a mixture of 62.5 parts of ABS resin, 12.5 parts antimony oxide and 25 parts of the adduct of cyclohexene with hexachlorocyclopentadiene (the product of Example 1A not post chlorinated) when ignited burned 20.3 seconds with an afterglow of 20 seconds. Thus, in addition to molding temperature stability, the product of Example I, Part B, possessed increased fire retarding efficiency at reduced loading, i.e. at lesser chlorine content.

EXAMPLE III

A molding prepared from a mixture of 80 parts of ABS (Blendex 101) 6.7 parts antimony oxide and 13.3 parts of the product of Example 1, Part C when tested by the modified ASTM-D635-72 procedure was self extinguishing within 2 seconds with no afterglow. The composition had an Oxygen Index of 38 (ASTM-D2863-70).

EXAMPLE IV

A molding prepared from a mixture of 80 parts of ABS (Blendex 101), 6.7 parts antimony oxide and 13.3 parts of the product of Example 1, Part D, when tested by the modified ASTM D635 procedure was self extinguishing within 9 seconds with an afterglow of 2 seconds. The composition had an Oxygen Index of 38(ASTM D2863-70).

EXAMPLE V

A molding prepared from a mixture of 80 parts polystyrene (Lustrex HF77), 5 parts antimony oxide, 15 parts of the product of Example I, Part B when tested in a manner similar to Example II was self-extinguishing within 3 seconds with an afterglow of 5 seconds (ASTM D635). The composition had an Oxygen Index of 24.2. In contrast, a similar mixture, in which the non-post-chlorinated adduct of cyclohexene with hexachlorocyclopentadiene (product of Example I, Part A) was substituted for the product of Example I, Part B, burned 15.3 seconds with an afterglow of 20 seconds.

EXAMPLE VI

A molding prepared from a mixture of 75 parts polystyrene (Lustrex HF77) 7 parts antimony oxide, 17 parts of the product of Example I, Part B, 0.5 parts of T-24 (a commercially available organo-tin stabilizer) and 1 part zinc stearate when tested in a manner similar to Example III was self-extinguishing immediately upon removal of the flame according to ASTM D635-72 and had an Oxygen Index (ASTM D2863-70) of 25.

EXAMPLE VII

A molding prepared from a mixture of 70 parts polypropylene (Hercules 6523) 11.7 parts antimony oxide and 23.3 parts of the product of Example 1, Part B, when tested in a manner similar to Example II, was self-extinguishing within 23 seconds with an afterglow of 91 seconds (ASTM-D635-72). The composition had an Oxygen Index of 24 (ASTM-D2863-70).

EXAMPLE VIII

A molding prepared from a mixture of 80 parts of Nylon 66, 14 parts of the product of Example I, Part B above, and 6 parts of zinc oxide, when tested according to the modified ASTM-D-635-72 procedure was self-extinguishing within 3 seconds with no afterglow. The composition had an Oxygen Index (ASTM-D2863-70) of 32.

EXAMPLE IX

A molding prepared from a mixture of 80 parts of polyethylene terphthalate, 15 parts of the product of Example I, Part B above, and 5 parts of antimony oxide, when tested according to the modified ASTM-D635-72 procedure, was self-extinguishing in 0 seconds with no afterglow. The composition had an Oxygen Index (ASTM-D2863-70) of 30.

EXAMPLE X

The following materials were compounded in a steam-mill at 50° to 70° to produce a rubber of good compatibility:
50 parts of SBR Rubber (Ameripol 1500),
A mixture of 20 parts carbon black (HAF Black) and 5 parts of Mobisol oil,
A mixture of 1 part stearic acid 1.5 parts zinc oxide and 7.5 parts antimony oxide
15 parts of the product of Example 1, Part B above
A mixture of 1 part sulfur and 0.6 part Santecure (a curing agent).

The resultant rubber was molded, at 280 degrees Fahrenheit into one-eighth inch bars. The bars when tested according to the modified ASTM-D635-72 procedure, was self-extinguishing within 48 seconds. The composition had an Oxygen Index (ASTM-D2863-70) of 24.5.

EXAMPLE XI

A mixture of 50 parts of a commercial epoxy resin (Ciba Arnoldite 6010, Batch No. 3649), 15 parts of antimony oxide, and 30 parts of the product of Example I, Part B above was ground to a paste. To this paste, 50 parts of the same epoxy resin and 12 parts of diethylene triamine were added and the resultant mixture was cured. The cured epoxy resin composition was self-extinguishing within one second and had no afterglow (by the modified ASTM-D-635-73 procedure). The resin composition has an Oxygen Index (ASTM-D2863-70) of 32 and a rating of SE II according to the UL-94-Test.

EXAMPLE XII

A molding prepared from a mixture of 80 parts of Nylon 66 resin, 14 parts of the product of Example I, Part C above, and 6 parts of zinc oxide was self-extinguishing within 5 seconds with no afterglow (by the modified ASTM-D-635-72 procedure). The composition had an Oxygen Index of 29 (ASTM-D2863-70).

EXAMPLE XIII

A molding prepared from a mixture of 80 parts of polyethylene terphthalate, 15 parts of the product of Example I, Part C above, and 5 parts of antimony oxide was self-extinguishing within 0 seconds with no afterglow (modified ASTM-D635-72 procedure). The composition had an Oxygen Index of 32 (ASTM-D2863-70).

EXAMPLE XIV

An elastomer prepared according to the procedure set out in Example X above, but using 15 parts of the product of Example I, Part C above in place of the product of Example I, Part B, showed good compatibility. When molded at 280° Fahrenheit into one-eighth inch bars, the bars were self-extinguishing within 6 seconds (by the modified ASTM-D635-72 procedure). This composition had an Oxygen Index of 27 (ASTM-D-2863-70).

EXAMPLE XV

A cured epoxy resin composition prepared as directed in Example XI above but using a like amount of the product of Example I, Part C above in place of the product of Example I, Part B, was self-extinguishing within 0 seconds with no afterglow (modified ASTM-D-635-72 procedure). The composition had an Oxygen Index of 31.5 (ASTM-D2863-70) and a rating of SEII when tested according to the UL-94 test.

EXAMPLE XVI

A molding prepared from a mixture of 80 parts of Nylon 66 resin, 14 parts of the product of Example I, Part D above, and 6 parts of zinc oxide was self-extinguishing within 5 seconds with no afterglow (modified ASTM-D-635-72 procedure). The composition had an Oxygen Index of 29 (ASTM-D2863-70).

EXAMPLE XVII

A molding prepared from a mixture of 80 parts of polyethylene terphthalate, 15 parts of the product of Example I, Part D above, and 5 parts of antimony oxide was self-extinguishing within 0 seconds with no afterglow (modified ASTM-D635-72 procedure). The composition had an Oxygen Index of 33 (ASTM-D2863-70).

EXAMPLE XVIII

An elastomer was prepared according to the procedure set out in Example X above, but using a like amount of the product of Example I, Part D above, in place of the product of Example I, Part B. The rubber product showed good compatibility and when molded, at 280° Fahrenheit, into one-eighth inch bars, was self-extinguishing within 8 seconds (modified ASTM-D635-72 procedure). The composition had an Oxygen Index of 25.5 (ASTM-D2863-70).

EXAMPLE XIX

A cured epoxy resin was prepared according to the procedure set out in Example XI, above, but using a like amount of the product of Example I, Part D, above, in place of the product of Example I, Part B. The resin was self-extinguishing within 0 seconds with no afterglow. (Modified ASTM - D635-72 procedure). The resin composition had an Oxygen Index of 31.5 (ASTM-D-2863-70) and a rating of SE-O according to the UL-94 Test.

Various changes and modifications may be made in the methods and compositions of this invention, certain preferred forms of which have been herein described, without departing from the scope and spirit of the invention.

What is claimed is:

1. A fire retardant polymeric composition comprising a polymer and an effective fire retardant amount of a compound of the formula

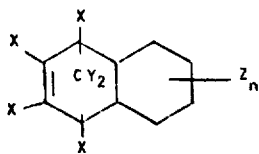

wherein X is a halogen independently selected from the group consisting of fluorine, chlorine, and bromine, Y is independently selected from the group consisting of fluorine, chlorine, bromine, alkyl of 1 to 10 carbon atoms, alkyloxy of 1 to 10 carbon atoms, monohaloalkyl and alkyloxy wherein said alkyl group contains 1 to 10 carbon atoms wherein said halo is fluoro, chloro, or bromo, Z is a halogen selected from the group consisting of chlorine, bromine, and mixtures thereof, and n is 1 to 8.

2. The composition of claim 1 wherein the polymer is a graft copolymer of polybutadiene, styrene and acrylonitrile.

3. The composition of claim 2 wherein X, Y, and Z are chlorine and n is about 4.

4. The composition of claim 1 wherein X and Y are chlorine, Z is bromine and n is about 2.

5. The composition of claim 1 wherein X and Y are chlorine, $n$ is about 3 and about two Z's are bromine and about one Z is chlorine.

6. The composition of claim 1 wherein the polymer is polystyrene.

7. The composition of claim 6 wherein X, Y and Z are chlorine and $n$ is about 4.

8. The composition of claim 1 wherein the polymer is polypropylene.

9. The composition of claim 8 wherein X, Y and Z are chlorine and n is about 4.

10. The composition of claim 1 wherein said compound is present in an amount from about 2 to about 50 percent by weight of the said composition.

11. The composition of claim 10 wherein said compound is present in an amount of from about 5 to about 40 percent by weight of said composition.

12. The composition of claim 11 wherein said compound is present in an amount of from about 10 to about 35 percent by weight of said composition.

13. The composition of claim 1 wherein said composition contains also from about 1 to about 30 percent by weight of antimony oxide.

14. The composition of claim 13 wherein said antimony oxide is present in said composition in an amount of from about 2 to about 25 percent by weight.

* * * * *